(No Model.)
C. W. CLARK & T. D. KEASEY.
PULLEY.
No. 403,987. Patented May 28, 1889.
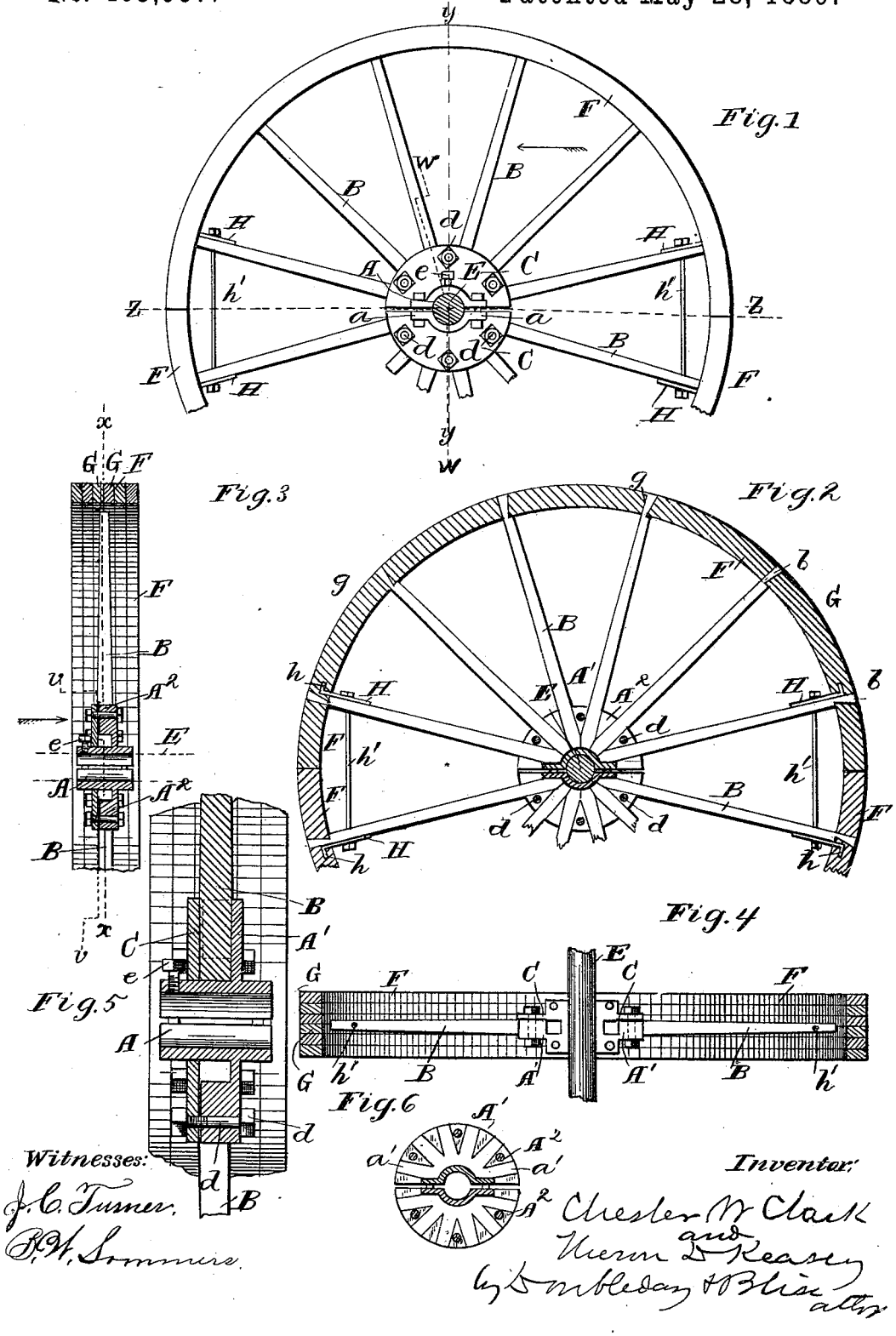

UNITED STATES PATENT OFFICE.

CHESTER W. CLARK AND THERON D. KEASEY, OF MISHAWAKA, INDIANA, ASSIGNORS TO THE KEASEY PULLEY COMPANY, OF SAME PLACE.

PULLEY.

SPECIFICATION forming part of Letters Patent No. 403,987, dated May 28, 1889.

Application filed February 17, 1888. Serial No. 264,372. (No model.)

*To all whom it may concern:*

Be it known that we, CHESTER W. CLARK and THERON D. KEASEY, citizens of the United States, residing at Mishawaka, in the county of St. Joseph and State of Indiana, have invented certain new and useful Improvements in Pulleys, of which the following is a specification, reference being had therein to the accompanying drawings.

Our invention relates to what are commonly known as "separable" pulleys or "split" pulleys; and it consists in certain novel features of construction and combination, as will be referred to in the claims.

Figure 1 is a side elevation of enough of a pulley to illustrate our invention. Fig. 2 is a central vertical section on line $x\,x$, Fig. 3. Fig. 3 is a vertical section on line $y\,y$, Fig. 1. Fig. 4 is a horizontal section on line $z\,z$, Fig. 1. Fig. 5 is a detached view of a part of Fig. 1, taken on line $w\,w$, Fig. 1, enlarged. Fig. 6 is a vertical section on line $v\,v$, Fig. 3, looking in the direction of the arrow, Fig. 3, the spokes being omitted.

A A are half-hubs adapted to be clamped tightly to the shaft by means of bolts passing through the ears or lugs $a\,a$ of the half-hubs.

A' A' are half-flanges cast upon the half-hubs, with spacing-blocks $A^2\,A^2$ cast upon their inner faces. These blocks are wedge-shaped, with sockets $a'$ between them for the reception of the inner ends of the spokes B. The outer ends of these spokes are preferably dovetailed, as at $b$, and are rectangular in cross-section, with their wider faces against the half-flanges A, such arrangement of material securing greater strength to the pulley with a given amount of wood.

C C are half-flanges upon the opposite sides of the spokes.

$d\,d$ are bolts or set-screws, by means of which the half-hubs and the spokes may be firmly bound together, with the inner ends of the spokes abutting against the half-hubs.

$e$ (see Figs. 1 and 5) is a set-screw to assist in further securing the pulley in place upon the shaft E.

We are aware that pulleys have heretofore been made having half-hubs each provided with semicircular flanges, separable flanges, semicircular webs, and bolts passing through the flanges and the webs, the rims of such pulleys being made up of overlapping segments, with bolts passing through the overlapping segments on lines parallel with the pulley-shaft; but in such structure the separable flanges were arranged with their dividing-lines at right angles to the dividing-lines of the half-hubs and the flanges attached to the half-hubs.

The rim of the pulley is made up of a series of segments, F G, placed face to face, the inner ones, G, having dovetailed seats to receive the dovetailed outer ends of the spokes, and having also L-shaped seats for the reception of the outer ends of clamps, to be described. (See particularly Figs. 2 and 3.) The band or rim is preferably made in two semicircular sections, as indicated in the drawings; and to effectually secure these sections in proper working relation we propose to employ clamps H $h$, applied to those spokes which are next to the ends of the segments. The outer end, $h$, of each clamp is at an angle to the shank part H and is embedded in the rim, so that it shall not project beyond its periphery and be liable to injure the belt.

Our method of building up the rim from segments placed face to face enables us to not only dovetail the ends of the spokes, but also to form these L-shaped seats for the clamps as the rim is being built; and the use of radial spokes and a rim the cut ends of which abut against each other, with tightening-bolts passing through the spokes, enables us to bind the inner ends of the spokes firmly against the half-hubs and the cut ends of the rim tightly against each other, even though it be found necessary to cut off slightly the inner ends of the spokes and the adjacent ends of the rim to attain such result—a mode of operation which is not possible with earlier constructions. So, also, our arrangement of the flanges with their dividing-lines, being substantially parallel lines instead of crossing each other, enables us to make some adjustments and adaptations of parts to different sizes of shafts without disturbing the relative desirable arrangement of bolt-holes in the flanges, and this arrangement of parts is found otherwise advantageous.

$h'\,h'$ are tightening-bolts, which pass through the clamps and the adjacent spokes, so that as thus arranged the clamps serve the additional function of strengthening the spokes at those points and the further function of protecting the spokes against the abrasion which would otherwise be incident to screwing up the nuts on the bolts.

By reason of making the spacing-blocks $A^2$ so short that their inner pointed ends do not reach the periphery of the tubular parts of the half-hubs, and then making the inner ends of the spokes tapering, we are enabled to make perfectly tight-fitting joints between the half-hubs and the inner ends of the spokes, and also between the edges of the inner ends of the spokes, as is plainly indicated in Fig. 2.

While we have described the best construction and arrangement of parts now known to us for the carrying out of our invention, we do not wish to be limited thereby, because many modifications in detail will readily suggest themselves to one skilled in the art without departing from the spirit of our invention.

What we claim is—

1. In a split pulley, the combination of the half-hubs provided with semicircular flanges, the separable flanges, the spokes, and the bolts $d\ d$, arranged between the spokes, substantially as set forth.

2. In a split pulley, the combination of the half-hubs provided with the semicircular flanges, the separable flanges, the spokes, the clamping-bolts, the segmental rim, and the bolts $h'$ near the outer ends of the spokes, substantially as set forth.

3. In a split pulley, the combination, with the spokes and the rim provided with the L-shaped seats, of the clamps $h$, having their outer ends seated in said seats and their inner ends secured to the spokes, substantially as set forth.

4. In a split pulley, the combination, with the spokes having their outer ends dovetailed, of the rim provided with segments having their flat faces in contact and provided with dovetailed seats for the ends of the spokes, substantially as set forth.

5. In a split pulley, the combination, with the spokes having their ends dovetailed upon one edge and the rim provided with correspondingly-shaped dovetailed seats for the ends of the spokes and with L-shaped recesses, of the clamps arranged upon the straight edges of the spokes with their L-shaped ends projecting from that edge of the spoke which is opposite to the dovetail-shaped part, substantially as set forth.

6. In a split pulley, the combination, with the segmental rim provided with L-shaped seats for the clamps, of the spokes having their outer ends seated in the rim, the clamps having their outer ends in the L-shaped seats, and the bolts $h'$, engaging with the spokes and the clamps, substantially as set forth.

In testimony whereof we affix our signatures in presence of two witnesses.

CHESTER W. CLARK.
THERON D. KEASEY.

Witnesses:
HOD L. PIKE,
ADAM S. BAKER.